US012800121B2

(12) United States Patent
Matsushima et al.

(10) Patent No.: US 12,800,121 B2
(45) Date of Patent: Nov. 17, 2026

(54) VEHICLE EXTERIOR COMPONENT

(71) Applicant: TOYODA GOSEI CO., LTD., Kiyosu (JP)

(72) Inventors: Kenta Matsushima, Kiyosu (JP); Yukari Ito, Kiyosu (JP); Hiroaki Ando, Kiyosu (JP)

(73) Assignee: TOYODA GOSEI CO., LTD., Aichi-pref. (CN)

( * ) Notice: Subject to any disclaimer, the term of this patent is extended or adjusted under 35 U.S.C. 154(b) by 0 days.

(21) Appl. No.: 19/170,405

(22) Filed: Apr. 4, 2025

(65) Prior Publication Data

US 2025/0320978 A1 Oct. 16, 2025

(30) Foreign Application Priority Data

Apr. 16, 2024 (JP) ................................ 2024-066262
Sep. 27, 2024 (JP) ................................ 2024-169136

(51) Int. Cl.
*F21S 41/20* (2018.01)
*F21S 41/50* (2018.01)
*F21S 43/50* (2018.01)
*F21Y 115/10* (2016.01)

(52) U.S. Cl.
CPC ............. *F21S 41/285* (2018.01); *F21S 41/50* (2018.01); *F21S 43/50* (2018.01); *F21Y 2115/10* (2016.08)

(58) Field of Classification Search
CPC ........... F21S 41/285; F21S 41/50; F21S 43/50
See application file for complete search history.

(56) References Cited

U.S. PATENT DOCUMENTS

| | | | | |
|---|---|---|---|---|
| 6,637,920 | B2 * | 10/2003 | Murakoshi | F21V 7/28 362/346 |
| 10,457,201 | B2 * | 10/2019 | Salter | B60R 13/005 |
| 11,572,999 | B2 * | 2/2023 | Serizawa | F21S 43/245 |
| 2013/0063050 | A1 * | 3/2013 | Morikawa | G09G 3/001 315/316 |
| 2018/0119922 | A1 * | 5/2018 | Yamaguchi | B60K 35/22 |

FOREIGN PATENT DOCUMENTS

| | | | |
|---|---|---|---|
| JP | 2002-086057 | A | 3/2002 |
| JP | 4079468 | B2 | 4/2008 |
| JP | 2023-014610 | A | 1/2023 |

* cited by examiner

*Primary Examiner* — Matthew J. Peerce
(74) *Attorney, Agent, or Firm* — Posz Law Group, PLC

(57) ABSTRACT

A vehicle exterior component includes a housing having an opening, a light source disposed in the housing, and a cover that covers the opening of the housing. The cover includes a transparent base layer capable of transmitting light from the light source, and a color-developing layer that is stacked on the transparent base layer in a thickness direction. The color-developing layer includes an exterior color layer and a color adjustment layer that exhibit different colors from each other. The color adjustment layer is located closer to the light source than the exterior color layer is. When white light is transmitted through the color adjustment layer and the exterior color layer, the color adjustment layer maintains white color of the white light.

7 Claims, 7 Drawing Sheets

VEHICLE EXTERIOR COMPONENT

CROSS-REFERENCE TO RELATED APPLICATIONS

This application is based upon and claims the benefit of priority from Japanese Patent Application No. 2024-066262, filed on Apr. 16, 2024, and Japanese Patent Application No. 2024-169136, filed on Sep. 27, 2024, the entire contents of each of which are incorporated herein by reference.

BACKGROUND

1. Field

The present disclosure relates to a vehicle exterior component.

2. Description of Related Art

The vehicle exterior component is configured to be attached to a vehicle. The vehicle exterior component includes a cover that covers the opening of the housing. The vehicle exterior component is disposed such that the cover is exposed to the exterior of the vehicle. Since the cover is exposed to the exterior of the vehicle, it is desirable to improve its aesthetic appearance.

To improve the aesthetic appearance of the cover of the vehicle exterior component, a primer coat and a metallic coating film may be formed, as disclosed in Japanese Patent No. 4079468, on the surface of the cover that faces the exterior of the vehicle. Specifically, a neutral gray primer coat in which a white pigment and a black pigment are blended is formed on the surface of the cover that faces the exterior of the vehicle. Additionally, a metallic coating film containing sparkle particles is formed over the gray primer coat. The metallic coating film contains a colored pigment or the like for coloration.

When the primer coat and the metallic coating film disclosed in the above publication are applied to the outer surface of the cover of the vehicle exterior component (the surface facing the exterior of the vehicle), the following advantages are achieved. Specifically, when light from the exterior of the vehicle is reflected by the metallic coating film and the primer coat, the color of the reflected light exhibits a sparkling effect and a sense of perceived depth. In other words, the appearance of the cover has a sparkling effect and a sense of perceived depth when viewed from the exterior of the vehicle.

If the primer coat and the metallic coating film disclosed in the above publication are applied to the outer surface of the cover of the vehicle exterior component (the surface facing the exterior of the vehicle), the appearance of the cover has a sparkling effect and a sense of perceived depth when viewed from the exterior of the vehicle. However, even in this case, since the amount of light from the exterior of the vehicle reflected by the primer coat and the metallic coating film is reduced at night or the like, the appearance of the cover from the exterior of the vehicle becomes less noticeable.

In one general aspect, a vehicle exterior component includes a housing having an opening, a light source disposed in the housing, and a cover covering the opening of the housing. The vehicle exterior component is configured such that the cover is disposed to be exposed toward an exterior of a vehicle. The cover includes a transparent base layer capable of transmitting light from the light source, and a color-developing layer that is stacked on the transparent base layer in a thickness direction. The color-developing layer includes an exterior color layer and a color adjustment layer that exhibit different colors from each other. The color adjustment layer is located closer to the light source than the exterior color layer is. When white light is transmitted through the color adjustment layer and the exterior color layer, the color adjustment layer maintains white color of the white light.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A vehicle exterior component according to a first embodiment will now be described with reference to FIGS. 1 to 4.

Figure 1:
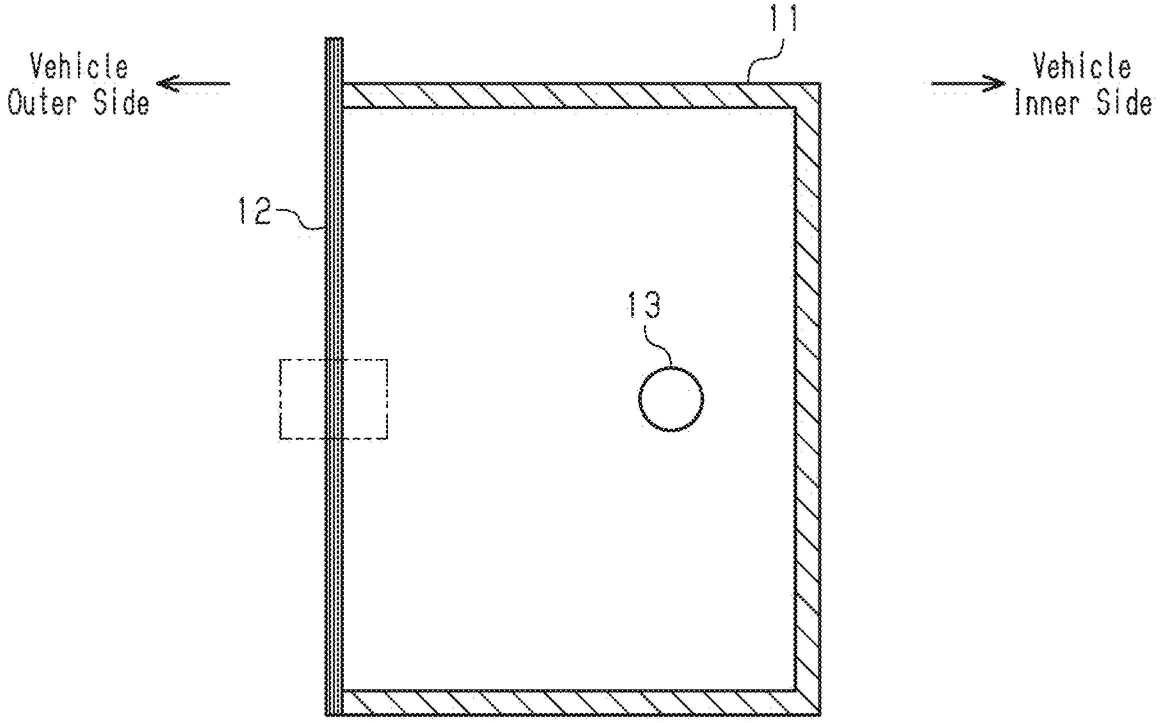
FIG. 1 is a schematic diagram showing the structure of a vehicle exterior component according to a first embodiment.

The vehicle exterior component shown in FIG. 1 is configured to be attached to a vehicle. The vehicle exterior component includes a housing 11, a cover 12, and a light source 13. The housing 11 has an opening. The cover 12 covers the opening of the housing 11. The light source 13 is disposed on an inside of the cover 12. For example, an LED that emits white light may be used as the light source 13. When the vehicle exterior component is attached to a vehicle, the cover 12 of the vehicle exterior component is disposed so as to be exposed to the exterior of the vehicle, that is, to the left in FIG. 1.

Cover 12

Figure 2:
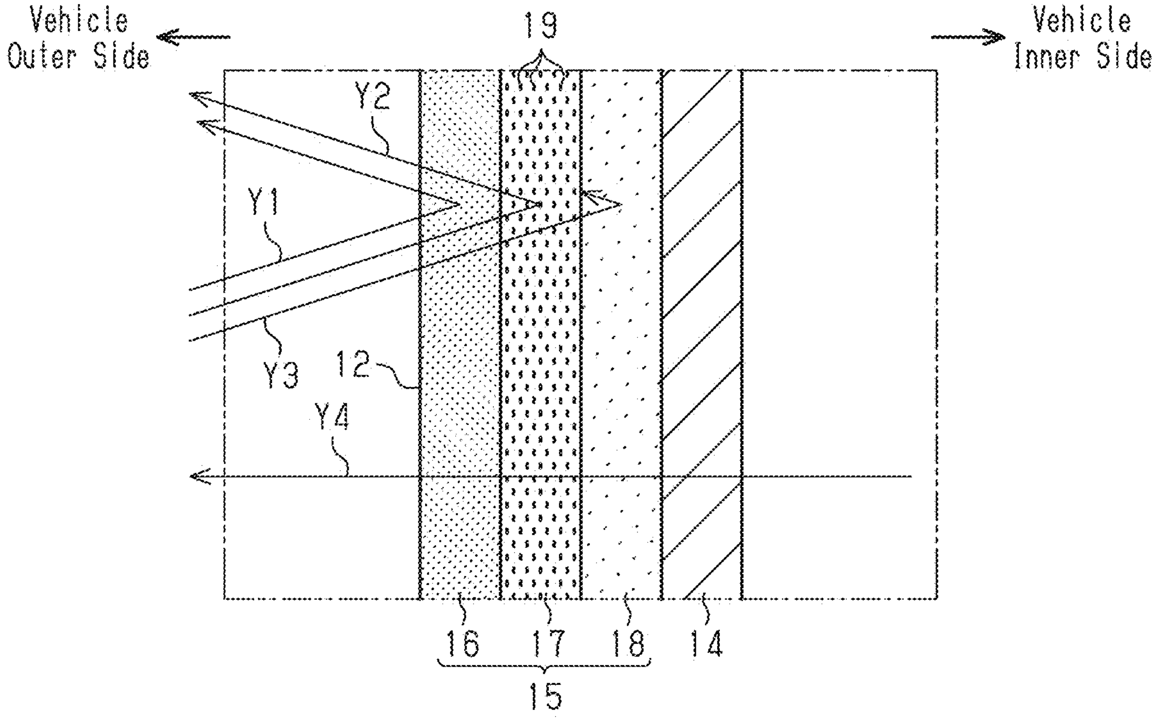
FIG. 2 is an enlarged cross-sectional view showing a portion surrounded by the long-dash double-short-dash line in the cover of the vehicle exterior component shown in FIG. 1.

As shown in FIG. 2, the cover 12 includes a transparent base layer 14 and a color-developing layer 15. The transparent base layer 14 can transmit light from the light source 13, which is disposed in the housing 11. The color-developing layer 15 is stacked on the transparent base layer 14 in the thickness direction. Specifically, the color-developing layer 15 is formed on a surface of the transparent base layer 14 that faces the exterior of the vehicle, that is, the left side in FIG. 2.

The color-developing layer 15 includes an exterior color layer 16, a concealing layer 17, and a color adjustment layer 18. The exterior color layer 16 and the color adjustment layer 18 exhibit different colors from each other. The color adjustment layer 18 is located closer to the transparent base layer 14, in other words, closer to the light source 13 than the exterior color layer 16 is. When white light is transmitted through the color adjustment layer 18 and the exterior color layer 16, the color adjustment layer 18 maintains white color of the white light.

The concealing layer 17 is located between the exterior color layer 16 and the color adjustment layer 18. The concealing layer 17 is formed of a smoke-colored paint. Thus, the concealing layer 17 blocks reflected light when light from the exterior of the vehicle is reflected by the color adjustment layer 18. The concealing layer 17 contains a large number of sparkle particles 19. The sparkle particles 19 are formed of, for example, aluminum.

Details of Each Layer in Cover 12

As the exterior color layer 16, for example, a layer containing a red pigment may be employed so that when light from the exterior of the vehicle is reflected by the exterior color layer 16 as indicated by arrow Y1, the exterior color layer 16 exhibits a red color. Light from the exterior of the vehicle is reflected not only by the exterior color layer 16 but also by the concealing layer 17, as indicated by arrow Y2. This provides the appearance of the cover 12, when viewed from the exterior of the vehicle, with a sparkling effect and a sense of perceived depth in addition to the red coloration of the exterior color layer 16.

In a case in which a layer that exhibits a red color is used as the exterior color layer 16, a layer that exhibits a green color is used as the color adjustment layer 18 so that white light remains white after being transmitted through the color adjustment layer 18 and the exterior color layer 16. Specifically, by including a green pigment in the color adjustment layer 18, the color adjustment layer 18 exhibits a green color when light from the exterior of the vehicle is reflected by the color adjustment layer 18 as indicated by arrow Y3. However, even if the light from the exterior of the vehicle is reflected by the color adjustment layer 18, the reflected light is blocked by the concealing layer 17. As a result, the coloration of a green color of the color adjustment layer 18 is prevented from being visible from the exterior of the vehicle.

Figure 3:
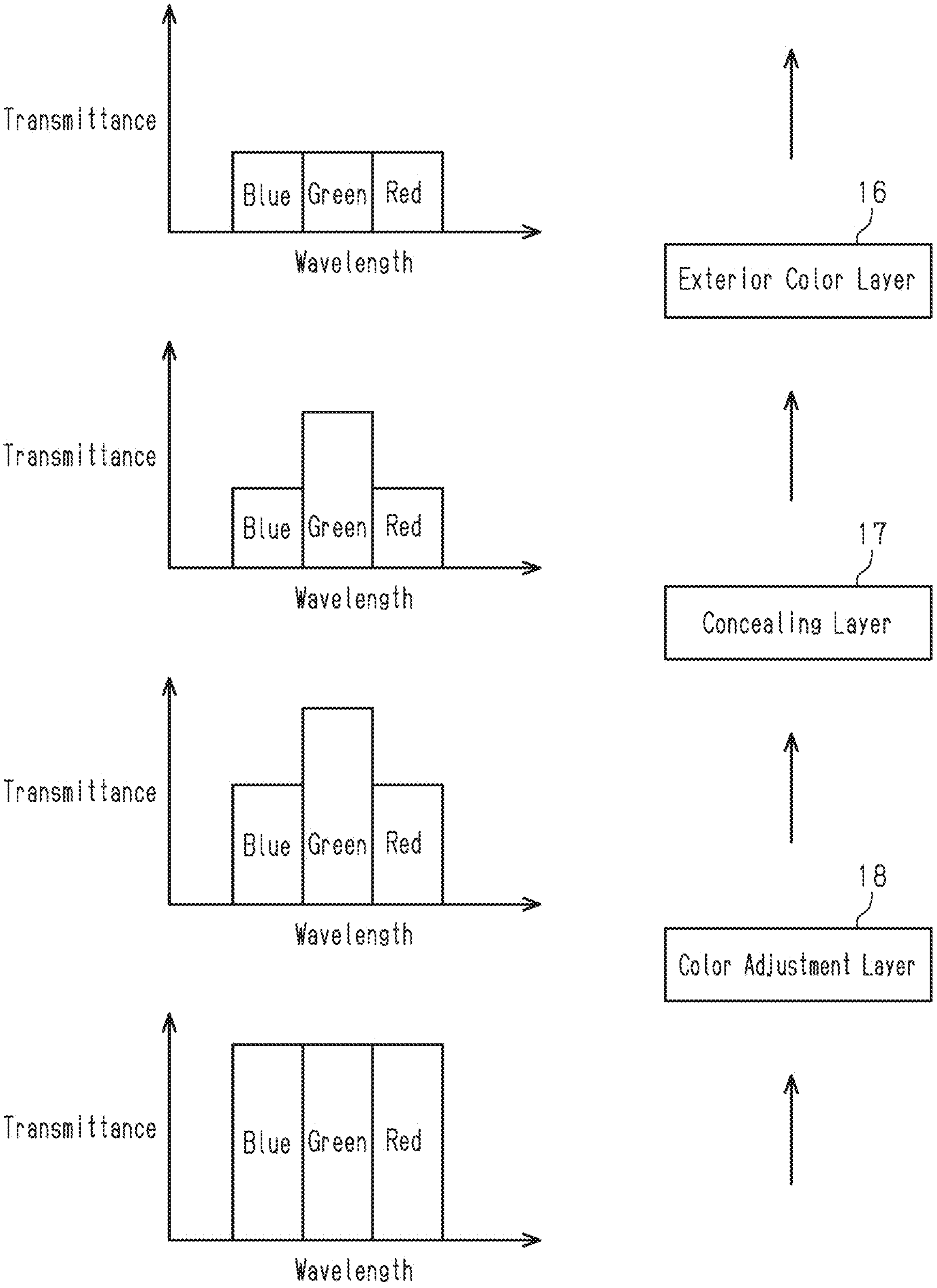
FIG. 3 is an explanatory diagram illustrating changes in the transmittances of light in a blue wavelength range, light in a green wavelength range, and light in a red wavelength range in white light when the white light sequentially is transmitted through a color adjustment layer, a concealing layer, and an exterior color layer.

FIG. 3 illustrates changes in the transmittance of light in the blue wavelength range, light in the green wavelength range, and light in the red wavelength range in white light when the white light sequentially is transmitted through the color adjustment layer 18, the concealing layer 17, and the exterior color layer 16.

As can be seen from FIG. 3, when white light is transmitted through the color adjustment layer 18, the light in the blue wavelength range and the light in the red wavelength range are absorbed, so that the transmittances of the light in the blue wavelength range and the light in the red wavelength range are reduced. As a result, the light transmitted through the color adjustment layer 18 becomes green. When this light is transmitted through the concealing layer 17, the transmittances of the lights in the blue, green, and read wavelength ranges are all reduced. As a result, the light transmitted through the concealing layer 17 also becomes green. When the light is transmitted through the exterior color layer 16, the light in the green wavelength range is absorbed, so that the transmittance of the light in the green wavelength range decreases to the transmittances of the light in the blue wavelength range and the red wavelength range. As a result, the light transmitted through the exterior color layer 16 becomes white.

As described above, in a case in which a layer that exhibits a red color is used as the exterior color layer 16, the use of a layer that exhibits a green color as the color adjustment layer 18 allows white light to remain white after being transmitted through the color adjustment layer 18 and the exterior color layer 16.

Transmittance of Visible Light Through Color Adjustment Layer 18 and Exterior Color Layer 16

The transmittances of visible light through the color adjustment layer 18 and the exterior color layer 16 are adjusted as follows so that white light remains white after being transmitted through the color adjustment layer 18 and the exterior color layer 16.

Figure 4:
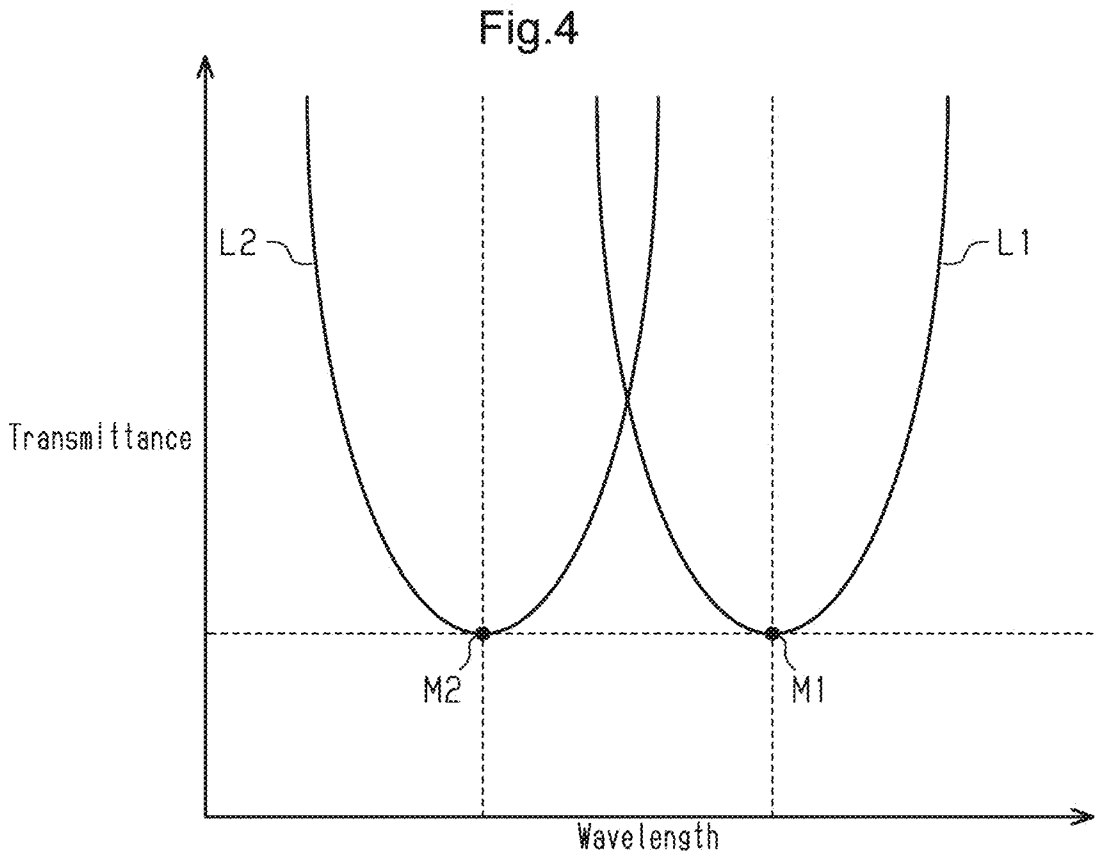
FIG. 4 is a graph showing changes in the transmittances of visible lights through the exterior color layer and the color adjustment layer when the wavelengths of visible lights are changed.

The transmittance of light in the red wavelength range through the exterior color layer 16 changes as shown by solid line L1 in FIG. 4 when the wavelength is changed. The minimum value M1 of the transmittance of the light in the red wavelength range through the exterior color layer 16 decreases as the ratio of the red pigment contained in the exterior color layer 16 increases. On the other hand, the transmittance of light in the green wavelength range through the color adjustment layer 18 changes as shown by solid line L2 in FIG. 4 when the wavelength is changed. The minimum value M2 of the transmittance of light in the green wavelength range through the color adjustment layer 18 decreases as the ratio of the green pigment contained in the color adjustment layer 18 increases.

The ratio of the red pigment contained in the exterior color layer 16 and the ratio of the green pigment contained in the color adjustment layer 18 are adjusted so as to equalize the minimum value M1 of the transmittance of the light in the red wavelength range through the exterior color layer 16 with the minimum value M2 of the transmittance of the light in the green wavelength range through the color adjustment layer 18. Accordingly, the amount of decrease in the transmittance of light in the blue wavelength range and the amount of decrease in the transmittance of light in the red wavelength range when white light is transmitted through the color adjustment layer 18 shown in FIG. 3 are equalized with the amount of decrease in the transmittance of light in the green wavelength range when light is transmitted through the exterior color layer 16 shown in FIG. 3. As a result, the white light remains white after being transmitted through the color adjustment layer 18 and the exterior color layer 16.

The vehicle exterior component according to the present embodiment has the following advantages.

(1-1) When the light source 13 is not turned on, light from the exterior of the vehicle is reflected by the exterior color layer 16, so that the coloration of the cover 12 is determined by the exterior color layer 16. On the other hand, when the light source 13 is turned on, light from the light source 13 is transmitted through the color adjustment layer 18 and the exterior color layer 16 as indicated by arrow Y4 in FIG. 2. When white light is transmitted through the color adjustment layer 18 and the exterior color layer 16, the color adjustment layer 18 maintains the white color of the white light. Thus, the light from the light source 13 that is transmitted through the color-developing layer 15 of the cover 12 exhibits a color different from the coloration provided by the exterior color layer 16. This allows the cover 12 to exhibit different colors depending on whether the light source 13 is off, such as during the daytime, or on, such as at night, thereby improving the aesthetic appearance of the cover 12. In addition, when the light source 13 is on at night or in similar conditions, the light from the light source 13 is transmitted through the color-developing layer 15 of the cover 12 toward the exterior of the vehicle. Thus, since the color of the light emitted from the cover 12 is made noticeable even at night or the like, the appearance of the cover 12 from the exterior of the vehicle at night or the like is improved.

(1-2) When light from the exterior of the vehicle is reflected by the color adjustment layer 18, the reflected light is blocked by the concealing layer 17 and is thus prevented from being transmitted through the exterior color layer 16. Therefore, when the reflected light is transmitted through the exterior color layer 16, the reflected light is prevented from affecting the coloration of the cover 12. The concealing layer 17 adjusts the amount of light transmitted from the light source 13 through the cover 12, and prevents the inside of the housing 11 from being seen from the exterior of the vehicle through the cover 12 when the light source 13 is not turned on.

(1-3) Light from the exterior of the vehicle is reflected also by the concealing layer 17. The concealing layer 17 is formed of a smoke-colored paint and contains a large number of the sparkle particles 19. Accordingly, when light from outside the vehicle is reflected by the concealing layer 17 and is transmitted through the exterior color layer 16, the appearance of the cover 12 exhibits not only the red coloration provided by the exterior color layer 16 but also a sense of perceived depth and a sparkling effect. Specifically, the perceived depth is provided by the smoke-colored paint of the concealing layer 17. The sparkling effect is provided by the reflection of light off the numerous sparkle particles 19 contained in the concealing layer 17. As a result, the aesthetic appearance of the cover 12 of the vehicle exterior component is improved.

(1-4) Since the minimum value M1 of the transmittance of light in the red wavelength range through the exterior color layer 16 is equalized with the minimum value M2 of the transmittance of light in the green wavelength range through the color adjustment layer 18, white light remains white after being transmitted through the color adjustment layer 18 and the exterior color layer 16.

Second Embodiment

Next, a vehicle exterior component according to a second embodiment will be described with reference to FIG. 5.

Figure 5:
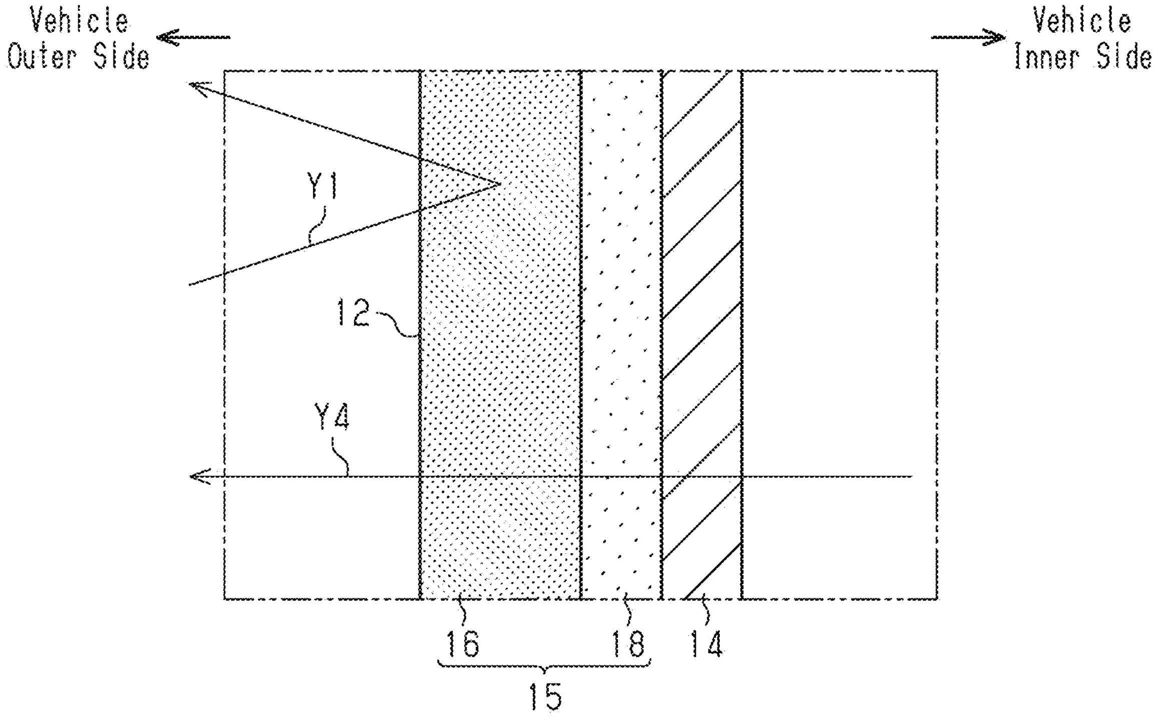
FIG. 5 is an enlarged cross-sectional view of a cover of a vehicle exterior component according to a second embodiment.

As shown in FIG. 5, the exterior color layer 16 of the cover 12 in the vehicle exterior component according to the second embodiment contains a black pigment so as to exhibit a black color when light from the exterior of the vehicle is reflected by the exterior color layer 16. The ratio of the black pigment contained in the exterior color layer 16 is adjusted so that white light can be transmitted through the exterior color layer 16.

In the cover 12 of the present embodiment, the concealing layer 17, as in the first embodiment, is omitted. The color-developing layer 15 is formed by the exterior color layer 16 and the color adjustment layer 18. Since the exterior color layer 16 contains a black pigment, reflected light, when light from outside the vehicle is reflected by the color adjustment layer 18, is blocked by the exterior color layer 16. When white light is transmitted through the exterior color layer 16, the transmitted light may be colored due to components other than the black pigment in the exterior color layer 16. The color adjustment layer 18 contains a color, such as a green pigment, so that white light remains white after being transmitted through the color adjustment layer 18 and the exterior color layer 16.

The present embodiment has the same advantage as (1-1) of the first embodiment.

Third Embodiment

Next, a vehicle exterior component according to a third embodiment will be described with reference to FIGS. 6 to 10.

In the third embodiment, the transmittances of respective wavelength bands of visible light through the exterior color layer 16 and the color adjustment layer 18 of the first and second embodiments are adjusted such that white light from the light source 13 remains white after being transmitted through the color adjustment layer 18 and the exterior color layer 16.

Figure 6:
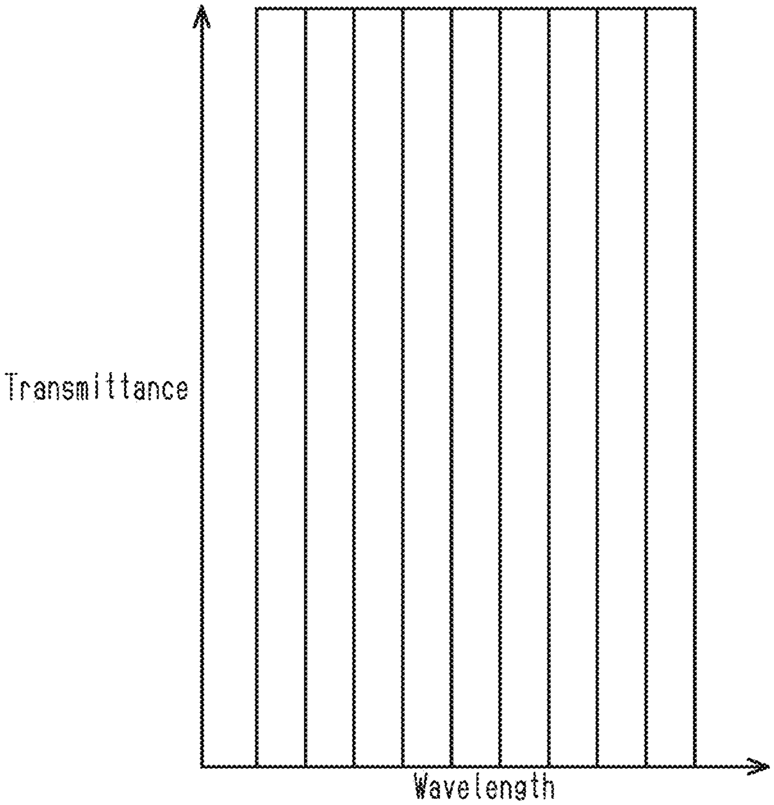
FIG. 6 is a graph showing initial values of transmittances of white light from a light source of a vehicle exterior component according to a third embodiment.
Figure 7:
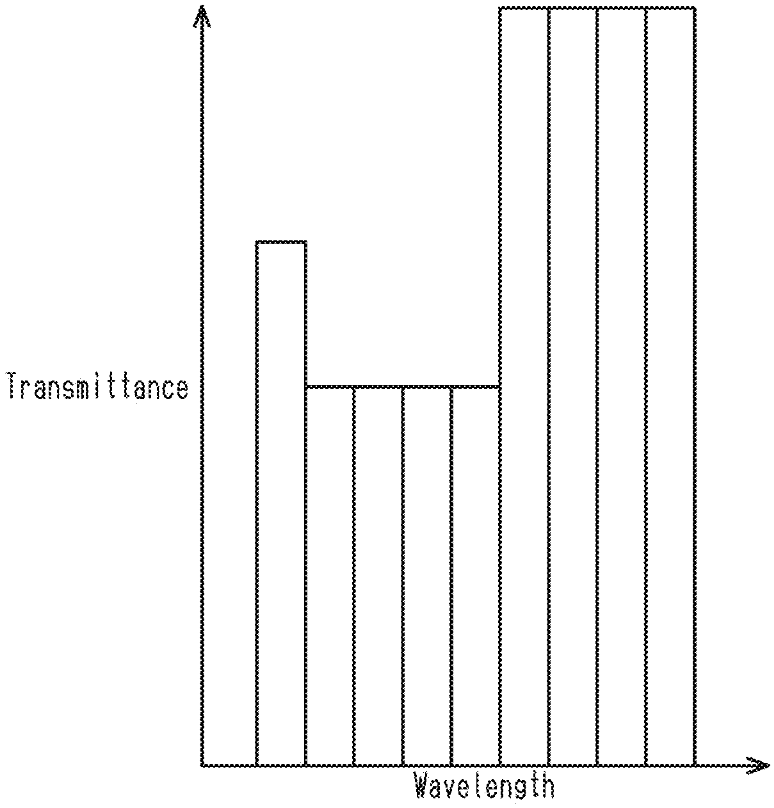
FIG. 7 is a graph showing transmittances in respective wavelength bands of visible light transmitted through an exterior color layer.
Figure 8:
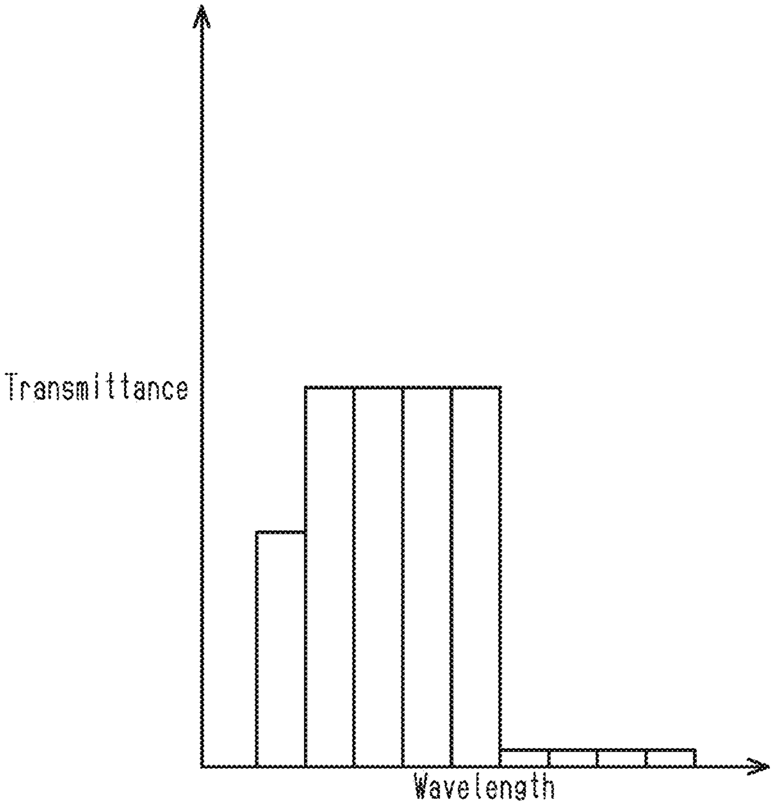
FIG. 8 is a graph showing transmittances in respective wavelength bands of visible light transmitted through a color adjustment layer.

When white light from the light source 13, that is visible light, is transmitted through the exterior color layer 16, the transmittances of respective wavelength bands in visible light change, for example, from the state shown in FIG. 6 to the state shown in FIG. 7. As a result, the light after being transmitted through the exterior color layer 16 becomes, for example, red. On the other hand, when the white light from the light source 13, that is visible light, is transmitted through the color adjustment layer 18, the transmittances of the respective wavelength bands in visible light change, for example, from the state shown in FIG. 6 to the state shown in FIG. 8. As a result, the light after being transmitted through the color adjustment layer 18 becomes, for example, green.

Figure 9:
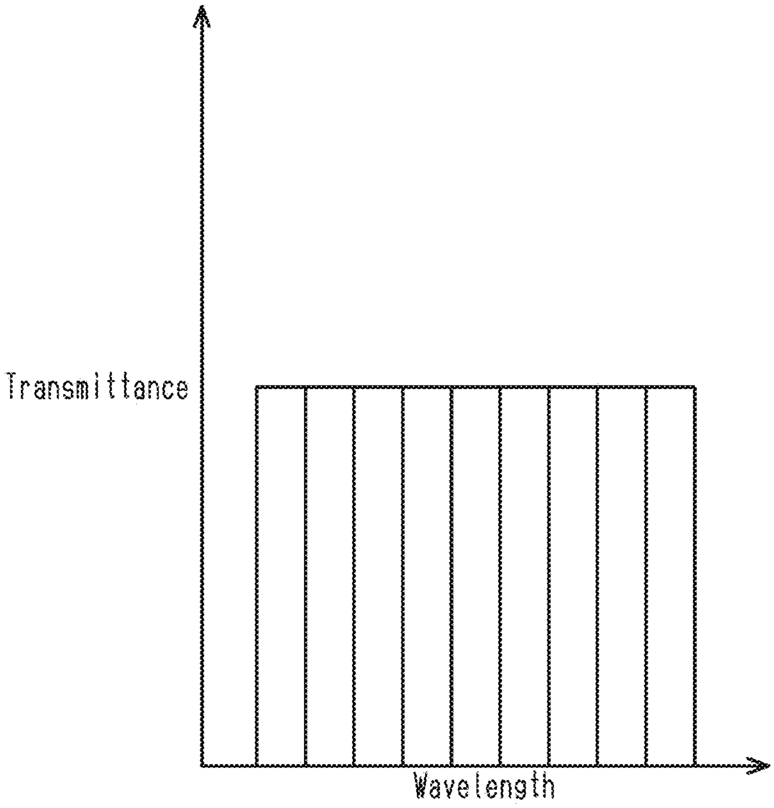
FIG. 9 is a graph showing transmittances in respective wavelength bands of visible light transmitted through the color adjustment layer and the exterior color layer.

To maintain the white color of the white light from the light source 13, even after being transmitted through the color adjustment layer 18 and the exterior color layer 16, the transmittances of the respective wavelength bands of visible light through the exterior color layer 16 and the transmittances of the respective wavelength bands of visible light through the color adjustment layer 18 may be determined as follows. The exterior color layer 16 and the color adjustment layer 18 are adjusted such that the product of the transmittances in corresponding wavelength bands becomes relatively uniform across the wavelength bands within the visible light range. In other words, when visible light is transmitted through both the exterior color layer 16 and the color adjustment layer 18, the transmittances of the respective wavelength bands are maintained at approximately similar levels. More preferably, the transmittances of the respective wavelength bands of visible light are equalized as shown in FIG. 9.

Figure 10:
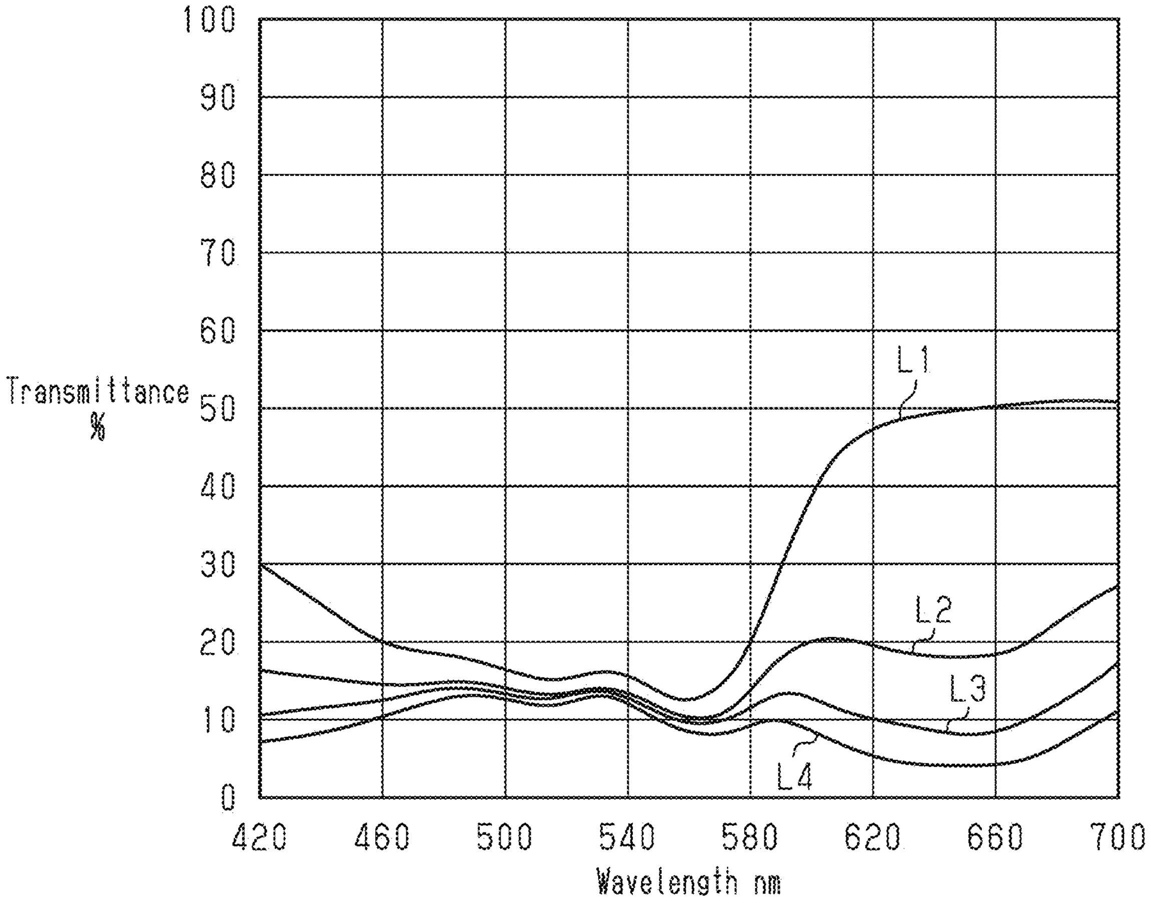
FIG. 10 is a detailed graph illustrating transmittances of respective wavelength bands of visible light transmitted through the color adjustment layer and the exterior color layer.

In FIG. 10, solid line L1 indicates the transmittances of the respective wavelength bands within the visible light wavelength range of 420 nm to 700 nm, when visible light is transmitted through the exterior color layer 16. In FIG. 10, solid lines L2 to L4 indicate the transmittances of the respective wavelength bands within the visible light wavelength range of 420 nm to 700 nm when visible light is transmitted through the exterior color layer 16 and the color adjustment layer 18. Solid lines L2 to L4 indicate the transmittances at which the white color light from the light sources 13, i.e., visible light, remains white when transmitted through the color adjustment layer 18 and the exterior color layer 16, more specifically, the transmittances in the respective wavelength bands within the visible light wavelength range of 420 nm to 700 nm.

As can be seen from solid line L1 in FIG. 10, when visible light is transmitted through the exterior color layer 16, the minimum values of the transmittances in the respective wavelength bands within the visible light wavelength range of 420 nm to 700 nm are about 13% in this example. On the other hand, the average value of the transmittance indicated by solid line L2, the average value of the transmittance indicated by solid line L3, and the average value of the transmittance indicated by solid line L4 are values within a range of 0.7 times to 1.3 times the minimum value. Therefore, by adjusting the exterior color layer 16 and the color adjustment layer 18 in such a manner, white light from the light source 13, that is, visible light remains white when transmitted through the color adjustment layer 18 and the exterior color layer 16.

The present embodiment has the following advantage in addition to advantages (1-1) to (1-3) of the first embodiment.

(3-1) The average value of the transmittances of the respective wavelength bands within the visible light wavelength range of 420 nm to 700 nm, after being transmitted through the exterior color layer 16 and the color adjustment layer 18, is within the range of 0.7 times to 1.3 times the minimum value of transmittance of each wavelength band within the visible light wavelength range of 420 nm to 700 nm after being transmitted through the exterior color layer 16. That is, the exterior color layer 16 and the color adjustment layer 18 are adjusted so as to satisfy the above condition. As a result, for each wavelength band within the visible light range, the product of the transmittance of the exterior color layer 16 and the transmittance of the color adjustment layer 18 at the corresponding wavelength band becomes relatively uniform across all wavelength bands within the visible light range. Consequently, when white light from the light source 13 is transmitted through the color adjustment layer 18 and the exterior color layer 16, the light remains white.

Other Embodiments

The above described embodiments may be modified as follows. The above-described embodiment and the following modifications can be combined as long as the combined modifications remain technically consistent with each other.

In the first embodiment, the exterior color layer 16 is not necessarily required to exhibit a red color; for example, it may exhibit a yellow or blue color. If the exterior color layer 16 exhibits a yellow color, the color adjustment layer 18 may be configured to exhibit a blue color, so that white light remains white after being transmitted through the color adjustment layer 18 and the exterior color layer 16. Further, if the exterior color layer 16 exhibits a blue color, the color adjustment layer 18 may be configured to exhibit a red color, so that white light remains white after being transmitted through the color adjustment layer 18 and the exterior color layer 16.

In the first embodiment, the light from the light source 13 that is transmitted through the cover 12 when the light source 13 is turned on is not limited to white light. For example, the color-developing layer 15 of the cover 12 may include a color-adding layer capable of transmitting light from the light source 13. The color-adding layer may add a color to the light from the light source 13 that is transmitted through the color adjustment layer 18 and the exterior color layer 16. The color-adding layer contains a pigment corresponding to the color to be added.

Figure 11:
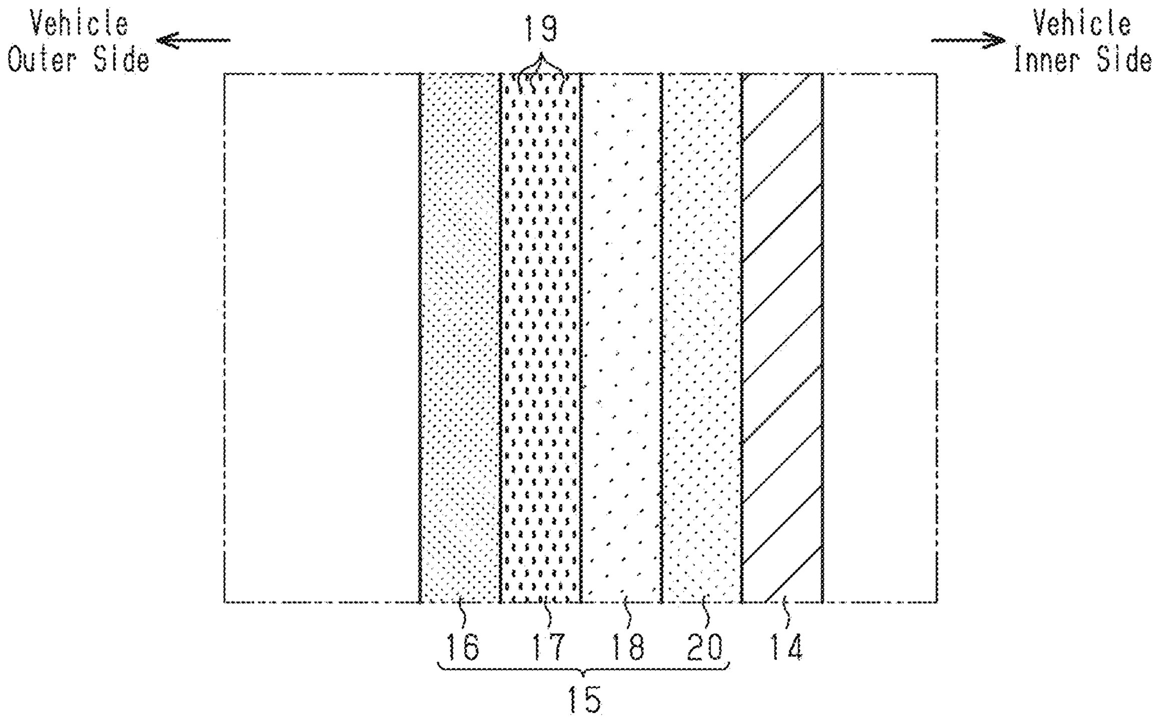
FIG. 11 is an enlarged cross-sectional view of a cover of a vehicle exterior component according to a modification.

In this case, when light from the light source 13 is transmitted through the color-adding layer, the color adjustment layer 18, and the exterior color layer 16, the light is imparted with a color by the color-adding layer. This allows the color of the light emitted from the cover 12 to be a color other than white, thereby improving the aesthetic appearance of the cover 12 in the vehicle exterior component. The color-adding layer may be formed between the transparent base layer 14 and the color adjustment layer 18, or on the surface of the transparent base layer 14 on the side facing the light source 13. FIG. 11 illustrates an example of the first embodiment in which the color-adding layer 20 is formed between the transparent base layer 14 and the color adjustment layer 18.

Figure 12:
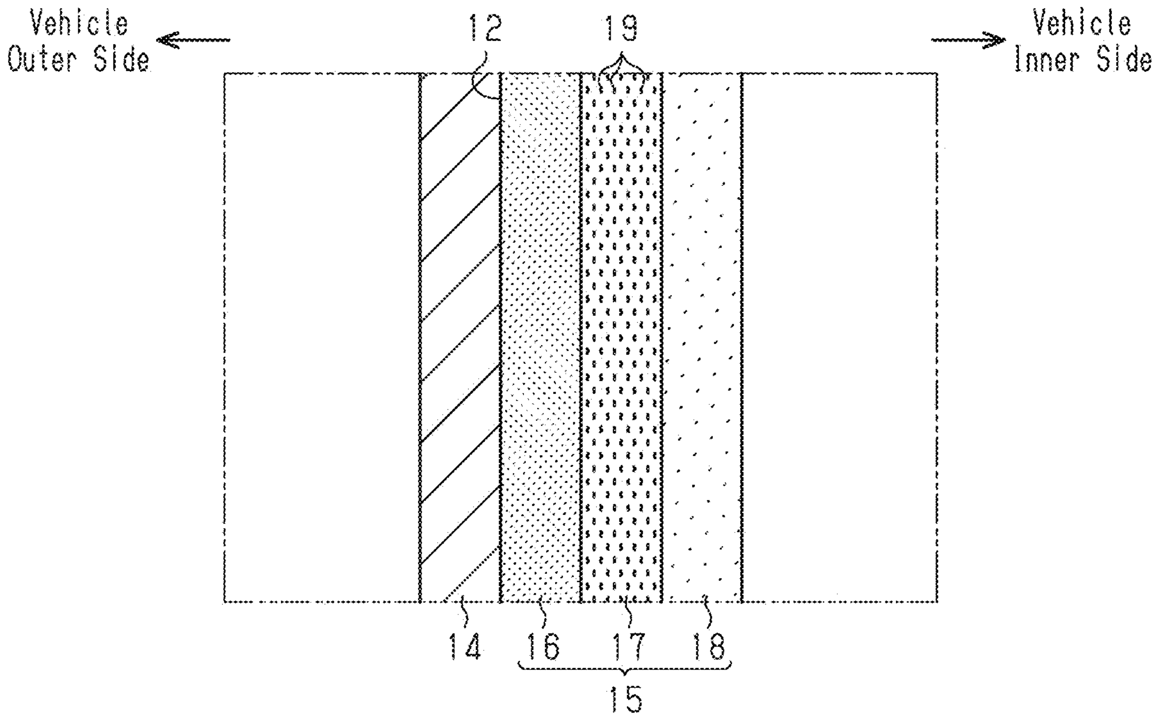
FIG. 12 is a cross-sectional view showing another example of the arrangement of the color-developing layer in the first embodiment.

In the first embodiment, as shown in FIG. 12, the color-developing layer 15 may be stacked on the surface of the transparent base layer 14 on the side facing the light source 13, specifically the right-side surface in FIG. 11. The color adjustment layer 18 of the color-developing layer 15 is located closer to the light source 13 than the exterior color layer 16 is. Further, if the color-developing layer 15 includes the aforementioned color-adding layer, this color-adding layer may be formed on the surface of the color-developing layer 15 on the side facing the light source 13 in the color adjustment layer 18.

In the second embodiment, the color-developing layer 15 may be formed on the surface of the transparent base layer 14 on the side facing the light source 13. In this case also, the color adjustment layer 18 of the color-developing layer 15 is located closer to the light source 13 than the exterior color layer 16 is.

In the first embodiment, the sparkle particles 19 may be formed from a sparkle material other than aluminum.

In the first embodiment, the concealing layer 17 does not necessarily need to contain the sparkle particles 19.

In the first embodiment, the concealing layer 17 in the color-developing layer 15 may be omitted.

In the third embodiment, the exterior color layer 16 may also exhibit a black color when light from outside the vehicle is reflected by the exterior color layer 16, as in the second embodiment. In this case also, the transmittance of each wavelength band of visible light through the exterior color layer 16 and the transmittance of each wavelength band of visible light through the color adjustment layer 18 are set such that the product of their transmittances at corresponding wavelength bands becomes relatively uniform across all wavelength bands within the visible light range.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle exterior component, comprising:

a housing having an opening;

a light source disposed in the housing; and a cover covering the opening of the housing, wherein the vehicle exterior component is configured such that the cover is disposed to be exposed toward an exterior of a vehicle, the cover includes:

a transparent base layer capable of transmitting light from the light source; and a color-developing layer that is stacked on the transparent base layer in a thickness direction, the color-developing layer includes an exterior color layer and a color adjustment layer that exhibit different colors from each other, the color adjustment layer contains pigment and is located closer to the light source than the exterior color layer is, when white light is transmitted through the color adjustment layer and the exterior color layer, the color adjustment layer maintains white color of the white light, the color-developing layer includes a concealing layer located between the exterior color layer and the color adjustment layer, and the concealing layer is formed of a smoke-colored paint.

2. The vehicle exterior component according to claim 1, wherein the concealing layer contains a large number of sparkle particles.

3. The vehicle exterior component according to claim 2, wherein, the exterior color layer and the color adjustment layer are colored so that a minimum value of transmittance of light in a red wavelength range through the exterior color layer is equal to a minimum value of transmittance of light in a green wavelength range through the color adjustment layer.

4. The vehicle exterior component according to claim 1, wherein, the exterior color layer and the color adjustment layer are colored so that a minimum value of transmittance of light in a red wavelength range through the exterior color layer is equal to a minimum value of transmittance of light in a green wavelength range through the color adjustment layer.

5. The vehicle exterior component according to claim 1, wherein the concealing layer is further configured to block light received from the exterior of the vehicle and reflected by the color adjustment layer.

6. A vehicle exterior component, comprising:

a housing having an opening;

a light source disposed in the housing; and a cover covering the opening of the housing, wherein the vehicle exterior component is configured such that the cover is disposed to be exposed toward an exterior of a vehicle, the cover includes:

a transparent base layer capable of transmitting light from the light source; and a color-developing layer that is stacked on the transparent base layer in a thickness direction, the color-developing layer includes an exterior color layer and a color adjustment layer that exhibit different colors from each other, the color adjustment layer contains pigment and is located closer to the light source than the exterior color layer is, when white light is transmitted through the color adjustment layer and the exterior color layer, the color adjustment layer maintains white color of the white light, the color-developing layer includes a color-change layer capable of transmitting light from the light source, the color-change layer is colored so as to change a color of white light transmitted therethrough, and the color-change layer is located closer to the light source than the color adjustment layer is.

7. The vehicle exterior component according to claim 6, wherein, the exterior color layer and the color adjustment layer are colored so that a minimum value of transmittance of light in a red wavelength range through the exterior color layer is equal to a minimum value of transmittance of light in a green wavelength range through the color adjustment layer.

* * * * *